UNITED STATES PATENT OFFICE.

SAMUEL PEACOCK, OF CHICAGO, ILLINOIS, ASSIGNOR TO INTERNATIONAL AGRICULTURAL CORPORATION, OF NEW YORK, N. Y., A CORPORATION OF NEW YORK.

PROCESS OF MAKING SILICON COMPOUNDS AND BY-PRODUCTS.

1,129,506. Specification of Letters Patent. Patented Feb. 23, 1915.

No Drawing. Application filed July 17, 1912. Serial No. 710,101.

*To all whom it may concern:*

Be it known that I, SAMUEL PEACOCK, a citizen of the United States, residing at Chicago, in the county of Cook and State of Illinois, have invented certain new and useful Improvements in Processes of Making Silicon Compounds and By-Products; and I do hereby declare the following to be a full, clear, and exact description of the invention, such as will enable others skilled in the art to which it appertains to make and use the same.

This invention relates to a process of producing silicon carbids in which alumina, potassium carbonate, and ammonia are obtained as by-products, and has for its object the manufacture of these compounds more expeditiously and with less expense than heretofore.

To these ends, the invention consists in the novel steps constituting my process more fully hereinafter disclosed and particularly pointed out in the claims.

In carrying out my invention, I preferably employ feldspar, or leucite, as the raw material, although, of course, other sources or silicon, aluminum, and potassium may be employed. I make a mixture of finely divided feldspar and carbon, and so proportion the same that there is present therein for every pound of alumina, substantially three-fourths of a pound of carbon; for each pound of potash ($K_2O$) there is present substantially three-tenths (.30) of a pound of carbon; and for each pound of silica there is present substantially eight-tenths (.80) pounds of carbon. This mixture is heated in an electric furnace, and as the temperature rises to say 2500° C., a flow of nitrogen gas is maintained through or over the mixture. This flow may be accomplished either by employing a closed furnace and sucking the gas through by means of a suitable pump, or the furnace may be open at one or both ends, and the gas forced through. I prefer the former, on account of the greater economy in the nitrogen required. Under such conditions and with the high temperature, the alumina present gives rise to a higher carbid $Al_2C_3$, which does not dissociate to form the lower carbid $Al_4C_3$, because said higher carbid immediately in the presence of nitrogen forms a carbo-nitrid in accordance with the following equation:—

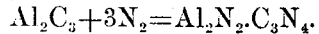

Likewise under the conditions stated, the potassium oxid present gives rise to a potassium carbid $K_2C$, which immediately forms a potassium carbo-nitrid in accordance with the following equation:—

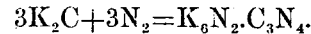

Both of these carbo-nitrids are volatile at high temperature employed, and may be conveniently sucked out of the furnace and collected in bag separators or forced into a digestor. By sucking out, or otherwise removing from the atmosphere of the furnace, these volatilized carbo-nitrids, as well as the other gaseous products of the reaction as fast as they are formed, I greatly increase the velocity of the reaction, and am further enabled to produce said nitrids at a lower temperature than would otherwise be the case. After the said carbo-nitrids are received in the digestor, they are subjected to the action of superheated steam at a pressure of say 5 to 7 atmospheres, whereupon the following reactions take place, producing alumina, potassium carbonate, and ammonia:—

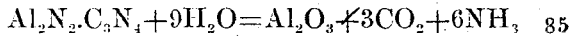

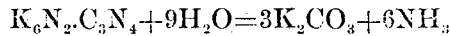

Of course, more or less silicon carbo-nitrid $Si_3N_4.C_6N_8$ will also form, but at the high temperature of the furnace charge, it will practically all dissociate and remain in the form of a carbid. By now cutting off the nitrogen and raising the temperature of the furnace to say 2800° C., the well known product siloxicon, $Si_2C_2O$, may be obtained, as well as other oxy carbids; and by still further increasing the temperature up to say 3500° C., the lower silicon carbid $SiC$ may be obtained. It will thus be seen that my invention takes advantage of the high temperature necessary to make siloxicon, or silicon carbid, to produce carbo-nitrids, without an extra cost of energy, and that from these carbids alumina, potassium carbonate, and ammonia may be produced. Further, the alumina and potash are separated from the mineral and the nitrogen fixation occurs before the temperatures necessary for the formation of the silicon compounds are reached; so that when said last mentioned compounds are to be formed, the proper proportions of silica are present in the charge. It therefore follows that the above by-products are obtained, without interfering with the regular process of making the said silicon compounds.

What I claim is:—

1. The process of producing a compound containing silicon and carbon while obtaining metallic carbo-nitrids as by products which consists in providing a suitable mixture of carbon and a mineral containing silicon, aluminum and potassium; heating said mixture in an atmosphere of nitrogen to a temperature sufficient to form in a gaseous state aluminum and potassium carbo-nitrids; removing said carbo-nitrids from the furnace; and further heating said charge to a temperature sufficient to form a compound containing silicon and carbon, substantially as described.

2. The process of producing a compound containing silicon and carbon while obtaining metallic carbo-nitrids as by products which consists in providing a suitable mixture of carbon and a mineral containing silicon, aluminum and potassium; heating said mixture in an atmosphere of nitrogen to a temperature sufficient to form in a gaseous state aluminum and potassium carbo-nitrids; removing said carbo-nitrids from the furnace as fast as formed; treating said removed carbo-nitrids with superheated steam; and further heating said charge to a temperature sufficient to form a compound containing silicon and carbon, substantially as described.

3. The process of producing a silicon and carbon compound while obtaining metallic carbo-nitrids as by products, which consists in providing a suitable finely divided mixture of carbon and feldspar; heating said mixture to substantially 2500° C. in the presence of free nitrogen; removing the products of the reaction from the furnace as fast as formed; and further heating said charge to a temperature sufficient to form said silicon and carbon compound, substantially as described.

In testimony whereof, I affix my signature, in presence of two witnesses.

SAMUEL PEACOCK.

Witnesses:
T. A. WITHERSPOON,
N. CURTIS LAMMOND.